(12) United States Patent
Andersson et al.

(10) Patent No.: US 6,340,206 B1
(45) Date of Patent: Jan. 22, 2002

(54) VEHICLE SEAT

(75) Inventors: Tommy Andersson, Växjo (SE); Timothy Barnett, Ballyclare (GB)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/508,374

(22) PCT Filed: Sep. 7, 1998

(86) PCT No.: PCT/SE98/01577

§ 371 Date: Aug. 22, 2000

§ 102(e) Date: Aug. 22, 2000

(87) PCT Pub. No.: WO99/12764

PCT Pub. Date: Mar. 18, 1999

(30) Foreign Application Priority Data

Sep. 10, 1997 (DE) .............................. 9719265

(51) Int. Cl.[7] .................................. B60N 2/42
(52) U.S. Cl. .............................. 297/216.14; 297/216.12
(58) Field of Search ................... 297/216.1, 216.12, 297/216.13, 216.14, 391, 410, 354.1, 354.12

(56) References Cited

U.S. PATENT DOCUMENTS

| | | | |
|---|---|---|---|
| 3,832,002 A | | 8/1974 | Eggert, Jr. et al. |
| 4,040,661 A | | 8/1977 | Hogan et al. |
| 5,772,280 A | * | 6/1998 | Massara |
| 5,823,619 A | * | 10/1998 | Heilig et al. |
| 5,882,071 A | * | 3/1999 | Fohl |
| 5,884,968 A | * | 3/1999 | Massara |
| 6,199,947 B1 | * | 3/2001 | Wiklund |

FOREIGN PATENT DOCUMENTS

| | | |
|---|---|---|
| DE | 38 31 790 | 3/1990 |
| DE | 197 50 375 | 5/1998 |
| GB | 1 228 657 | 4/1971 |
| GB | 1 285 360 | 8/1972 |
| GB | 2 311 212 | 9/1997 |

* cited by examiner

Primary Examiner—Milton Nelson, Jr.
(74) Attorney, Agent, or Firm—Venable; George H. Spencer; Robert Kinberg

(57) ABSTRACT

A vehicle seat, the seat comprises a squab and a back. The back is mounted for pivotal movement, relative to the squab, about a predetermined pivotal axis (19). The back is provided with a frame (42) supporting a head-rest, the said frame is movable between a lower position and an upper position. The head-rest carried by the frame (42) is located a greater distance from the top of the back of the seat when the frame (42) is in the elevated position. Means are provided to move the frame (42) from the lower position to the upper position in response to said rearward pivotal movement of the back of the seat about the predetermined pivotal axis (19).

6 Claims, 5 Drawing Sheets

VEHICLE SEAT

BACKGROUND OF THE INVENTION

THE PRESENT INVENTION relates to a vehicle seat and more particularly, relates to a vehicle seat intended for use in a motor vehicle such as a motor car.

It has been appreciated that if a motor vehicle, such as a motor car, is involved in a rear-end collision, or rear impact,—that is to say if a following vehicle runs into the back of the car—the occupants of the struck car often suffer from neck injuries.

It is to be understood that during a rear-end collision of this type, the vehicle that is struck is subjected to a forward acceleration. This imparts a forward acceleration to the seats of the vehicle. The squab and the back of each occupied seat engage the posterior and torso of the occupant of the seat and impart a substantial acceleration to the posterior and torso of the occupant. However, no corresponding acceleration is immediately imparted to the head of the occupant. The head is a part of the body that has substantial mass, and consequently the head has substantial inertia.

Thus, whilst the posterior and torso of the occupant of the vehicle are accelerated forwardly as a result of die rear-end collision, the head of the occupant of the vehicle initially remains stationary. This causes the neck initially to adopt a "S"-shaped configuration as the lower part of the neck moves forwardly, whilst remaining vertical, and the upper part of the neck remains in its initial position. Subsequently, the head begins to rotate, and the neck then occupies a curved configuration. The head subsequently moves forwardly. Research has shown that "whiplash" injuries may occur when the neck adopts the "S"-shaped configuration, if the head is moving, relative to the torso, at a substantial speed.

BRIEF SUMMARY OF INVENTION

The present invention seeks to provide an improved vehicle seat in which the risk of "whiplash" injuries occurring to the occupant of the seat during a rear-end collision are reduced.

According to this invention there is provided a vehicle seat, the seat comprising a squab and a back, the back being mounted for pivotal movement, relative to the squab, about a predetermined pivotal axis, the back being provided with a frame supporting a head-rest, the said frame being movable between a lower position and an upper position, the head-rest carried by the frame being located a greater distance from the top of the back of the seat when the frame is in the elevated position, means being provided to move the frame from the lower position to the upper position in response to said rearward pivotal movement of the back of the seat about the predetermined pivotal axis.

Preferably the means to cause the framework to move from the lower position to the upper position comprise a Bowden cable, the core of which is connected to move the said frame upwardly against a spring bias when the core of the cable is subjected to tension, and means to subject the core to tension in response to rearward pivotal movement of the back of the seat about the predetermined pivotal axis.

Advantageously the core of the Bowden cable is connected to a lever, the lever also being connected to at least one Bowden cable having its core connected to parts of a mechanism which move relative to fixed points on rearward pivotal movement of the back of the seat about the predetermined pivotal axis, with the core of the Bowden cables being connected to said fixed point.

Conveniently damper means are provided connected between the squab and back of the seat to damp said rearward pivotal movement of the back of the seat.

Advantageously the damper means comprise a gas spring

Preferably a recliner mechanism is provided connected between the back and sqab of the seat.

BRIEF DESCRIPTION OF THE DRAWINGS

In order that the invention may be more readily understood and so that further features thereof may be appreciated, the invention will now be described, by way of example, with reference to tie accompanying drawings in which.

DETAILED DESCRIPTION OF THE INVENTION

Referring initially to FIG. 1 of the accompanying drawings, illustration A shows the position of the head 1 and neck 2 of the occupant of a motor vehicle during ordinary conditions. The head and neck would occupy his position it for example, the vehicle were stationary.

Assuming that the vehicle was then subjected to a rear impact, the posterior and torso of the occupant of the vehicle would be moved forwardly, as a consequence of the forward movement of the vehicle and the forward movement of the seat mounted in the vehicle. The head 1 of the occupant would tend to remain stationary. A neck 2 of die occupant would then have the condition shown in illustration B. The neck here has a "S" configuration. Subsequently, as shown in illustration C, the head 1 moves rearwardly, thus giving the neck 2 an arcuate configuration and, if the head does not impinge on the head-rest, the head can move to the tilted back position shown in illustration D where the neck 2 is bent back (hyperextension) with a very significant degree of curvature.

It is believed that if tie neck is subject to the distortions shown in illustrations A to D, the hydro-dynaric pressure of the fluid within the spine can rise suddenly, when the neck adopts die "S"-straped configuration, thus imparting pressure shocks to parts of tie central nervous system in contact with that fluid. Also, injuries may well be imparted to the ganglia. It is believed that this is why patients with so-called "whiplash" injuries may suffer from the effects of those injuries for a long time. Even though a typical rear impact collision occurs with a relatively low impact speed, these collisions are responsible for a large number of relatively serious injuries each year.

Figure 1A:
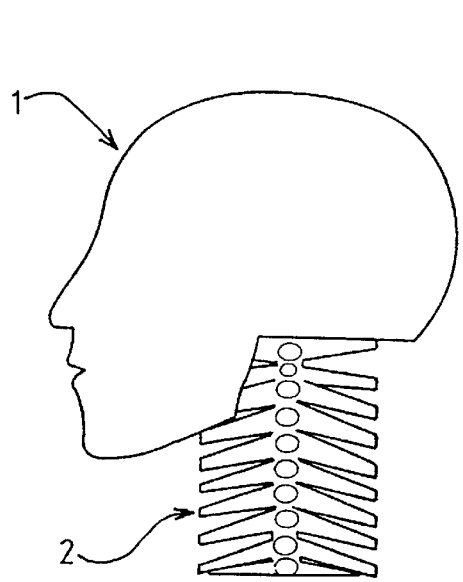
FIG. 1 is a diagrammatic view comprising four illustrations showing the condition of the head and neck of an occupant of the vehicle in a rear collision situation where a conventional seat is used.
Figure 1B:
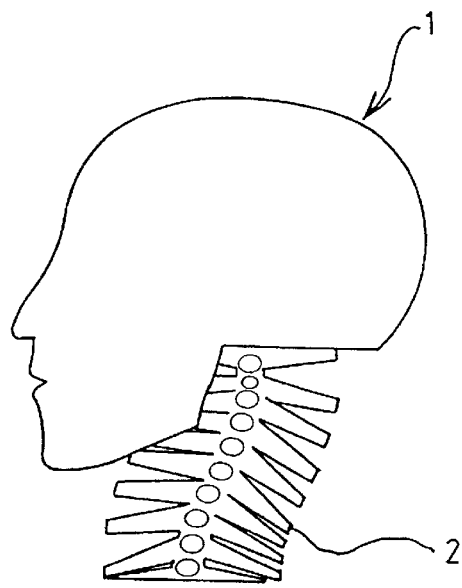
Figure 1C:
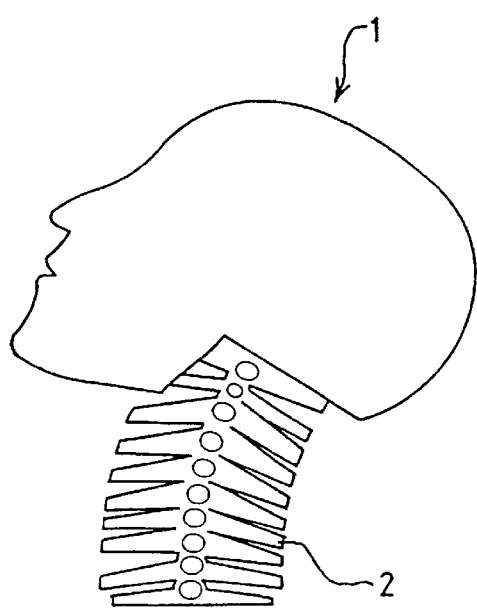
Figure 1D:
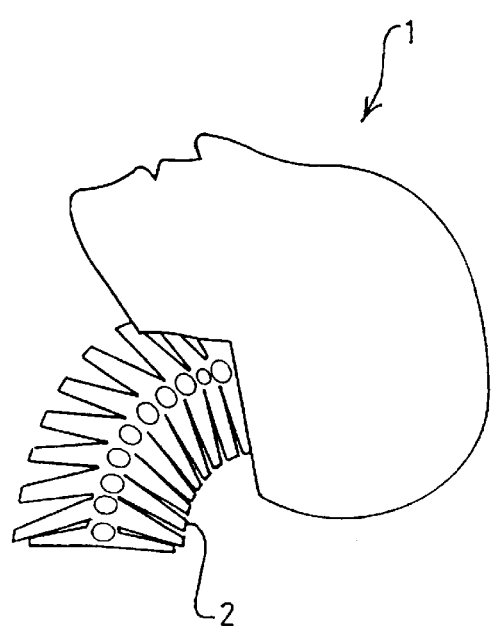
Figure 2:
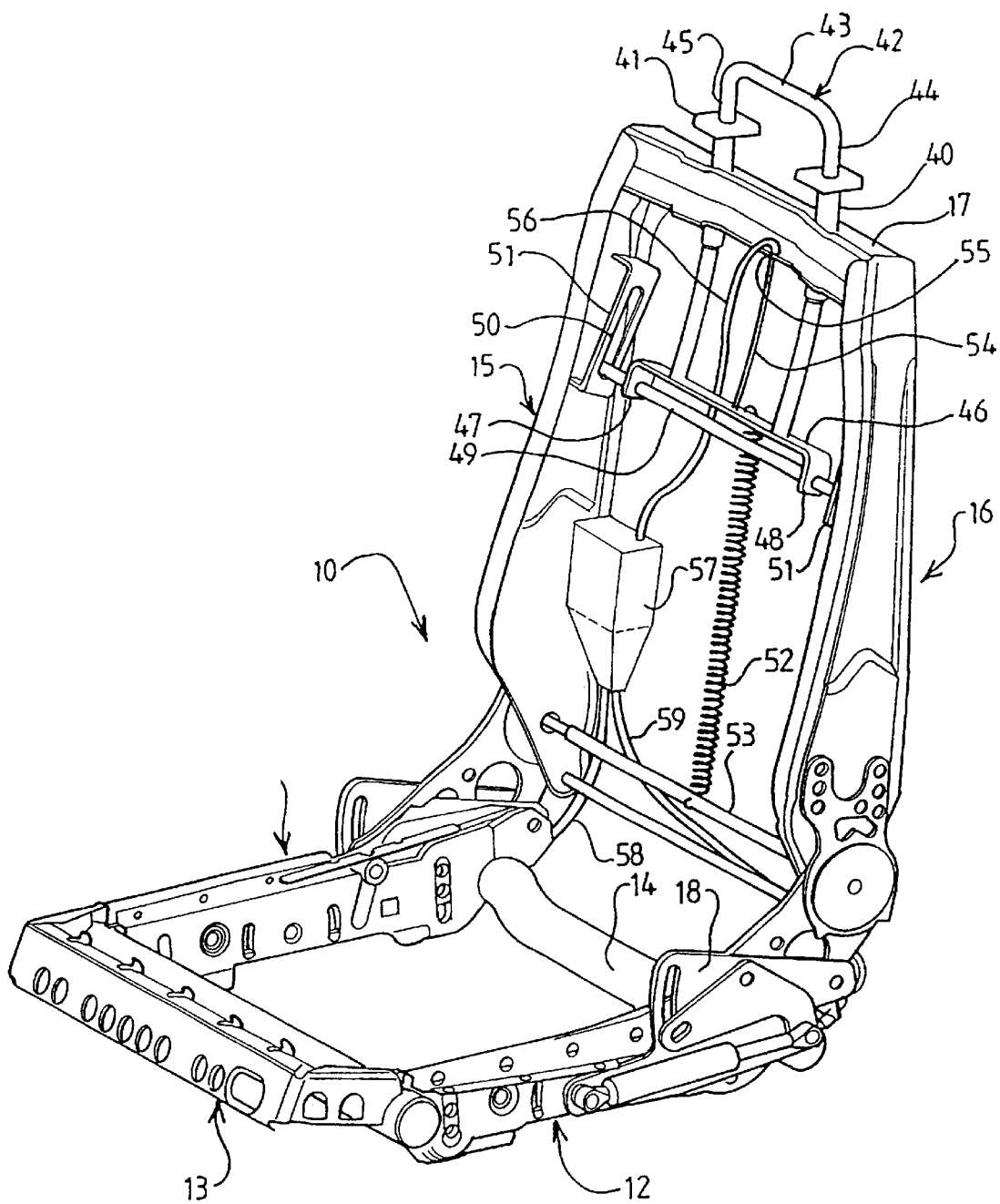
FIG. 2 is a perspective view of the frame of a vehicle seat, with the padding and upholstery removed.

Referring to FIG. 2 of tie accompanying drawings a frame 10 of a vehicle seat is illustrated. The frame 10 comprises two parallel alms 11,12, the forward ends of which are interconnected by a transverse bar 13 and the rearward ends of which are connected by a transverse beam 14. The arms 11, 12, 13 and the beam 14 define a first portion of the framework which will be located in the squab of the seat.

The seat further comprises two vertical arms 15,16, the upper ends of which are inter-connected by a horizontal arm 17, and the arms 15, 16 and 17 form a second portion of the framework that will be located in the back of the seat.

Figure 3:
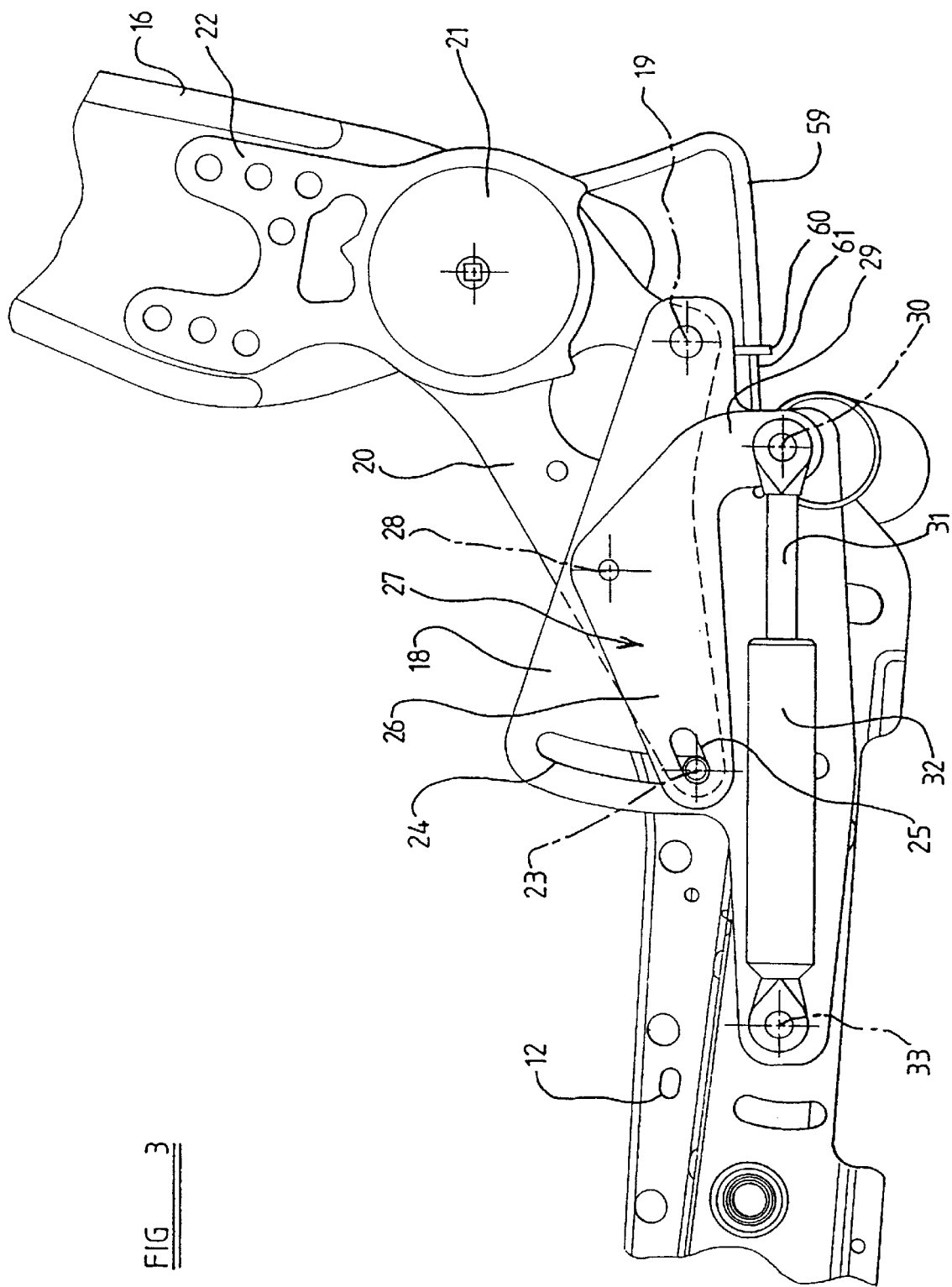
FIG. 3 is an enlarged side elevational view of pail of the seat of FIG. 2, with part shown in phantom.

Referring now additionally to FIG. 3, it is to be observed that the arm 12 carries, towards its rear end, a substantially vertical fixing plate 18. The fixing plate 18 is provided, towards its rear end, with an aperture which receives a pivot pin defining a pivot axis 19. The pivot pin serves to mount, on the fixing plate 18, an intermediate element 20 in the form of an elongate plate which forms one connecting plate of a recliner mechanism 21. The recliner mechanism may be of conventional form and has a second connecting plate 22 which is connected to the arm 16 forming the side of the frame for the back of the seat.

As will be appreciated from FIG. 2, an equivalent arrangement is provided on each side of the seat, and thus it is to be appreciated that the back of the seat is connected to the squab of die seat through two recliner mechanisms 21, which permits the conventional adjustment of die angle of rake of the back of the seat to suit the comfort of the driver or occupant of the vehicle, but the intermediate element 20 that forms one arm of each of the recliner mechanisms is pivotally connected to the support plate 18 by the pivot pin that defines the pivot axis 19.

Figure 5:
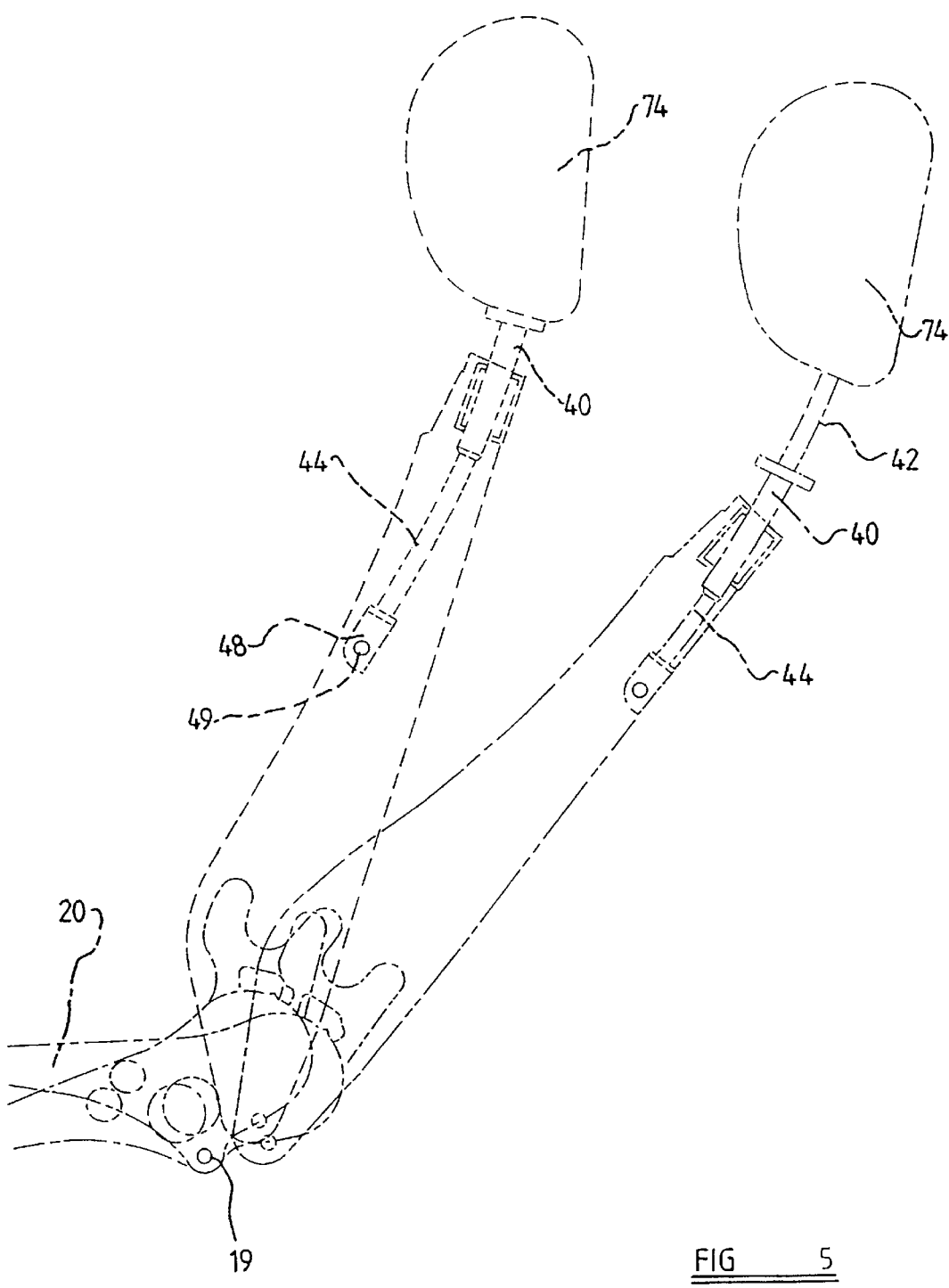
FIG. 5 is schematic view illustrating the back-rest of the seat in two alternate conditions.

The forward end of die intermediate element 20, which is of generally triangular form (as can be seen from FIG. 3 where the periphery of the element is shown in phantom, and also from FIG. 5) carries a transversely extending connecting pin 23. The transversely extending connecting pin 23 passes through an arcuate slot 24 formed in the fixing plate 18, and also passes through a linear oval slot 25 formed at the end of one lever arm 26 of a lever arm plate 27. The lever arm plate 27 is of generally triangular form and is mounted by a pivot for pivotal movement relative to the fixing plate 18 about a pivot axis 28 located adjacent an upper apex of the lever arm plate 27. The other lever arm of the lever arm plate 27 terminates in a depending lug 29, which is connected by means of a pivot pin defining a pivot axis 30 to a piston 31 which forms part of a conventional damper or gas spring 32. The other end of the damper or gas spring 32 is connected by appropriate connecting means 33 to part of the vertical fixing plate 18.

It is to be appreciated that when a vehicle in which the illustrated seat is mounted is involved in a rear impact, the torso of of the occupant of the seat will cause a rearwardly directed force to be applied to the back of the seat. This will tend to cause the entire back of the seat to pivot about the pivot axis 19. As the seat back pivots rearwardly about this pivot axis, the intermediate element will rotate about the pivot axis 19, and the transverse connecting pin 23 at the forward end of the intermediate element 20 will move up the arcuate slot 24. The lever arm 26 of the lever arm plate 27 will move upwardly, with the lever arm plate 27 pivoting about the pivot axis 28. The depending lug 29 will thus tend to move towards the left as shown in FIG. 3, against a retarding force provided by the damper or gas spring 32. The rearward movement of the back of the seat will thus be damped by the damper or gas spring 32.

Returning now to FIG. 2, it is to be observed that the horizontal arm 17 forming the upper part of die frame that defines the back of the seat, carries two tubular guides 40,41 which extend substantially vertically. A head-rest support frame 42 is provided comprising a transverse upper element 43 and two depending arcuate arms 44,45 which pass respectively through the tubular guides 40,41. The lower ends of the arcuate arms 44,45 are inter-connected by a transverse element 46 in the form of a plate 46. The plate 46 has terminal depending portions 47,48 which each define an aperture, the apertures receiving a horizontally extending rod 49. The opposed ends of the rod 49 are each received in a substantially vertical guide slot 50 formed in a guide plate 51 secured, respectively, to the arms 15,16 forming the sides of the frame that defines the back of the seat.

A spring 52 is provided which is connected to the transverse plate 46 and also connected to a further transverse rod 53 extending across the portion of the frame to be received within the back of die seat adjacent the base of that portion of the frame the frame. The spring serves to bias downwardly the headrest support frame 42.

A wire core 54 of a Bowden cable has one end connected to the transverse element 46. The wire core passes through a nipple 55 mounted on the horizontal arm 17. The outer sleeve 56 of the Bowden cable is connected to the nipple, and extends to a transfer box 57. Further Bowden cables 58,59 extend from the transfer box to the fixing plates 18 provided on the arms 11,12 of the portion of the frame to be received in the squab of the seat. As can be seen in FIG. 3, the Bowden cable 59 extends to a nipple 60 which is secured to the fixing plate 18. The core 61 of the Bowden cable extends to, and is connected to, the depending lug 29 formed on the lever arm plate 27.

It will thus be appreciated that as die back of the seat pivots rearwardly about the pivot axis 19, tension is applied to the core 61 of the Bowden cable 59.

Figure 4:
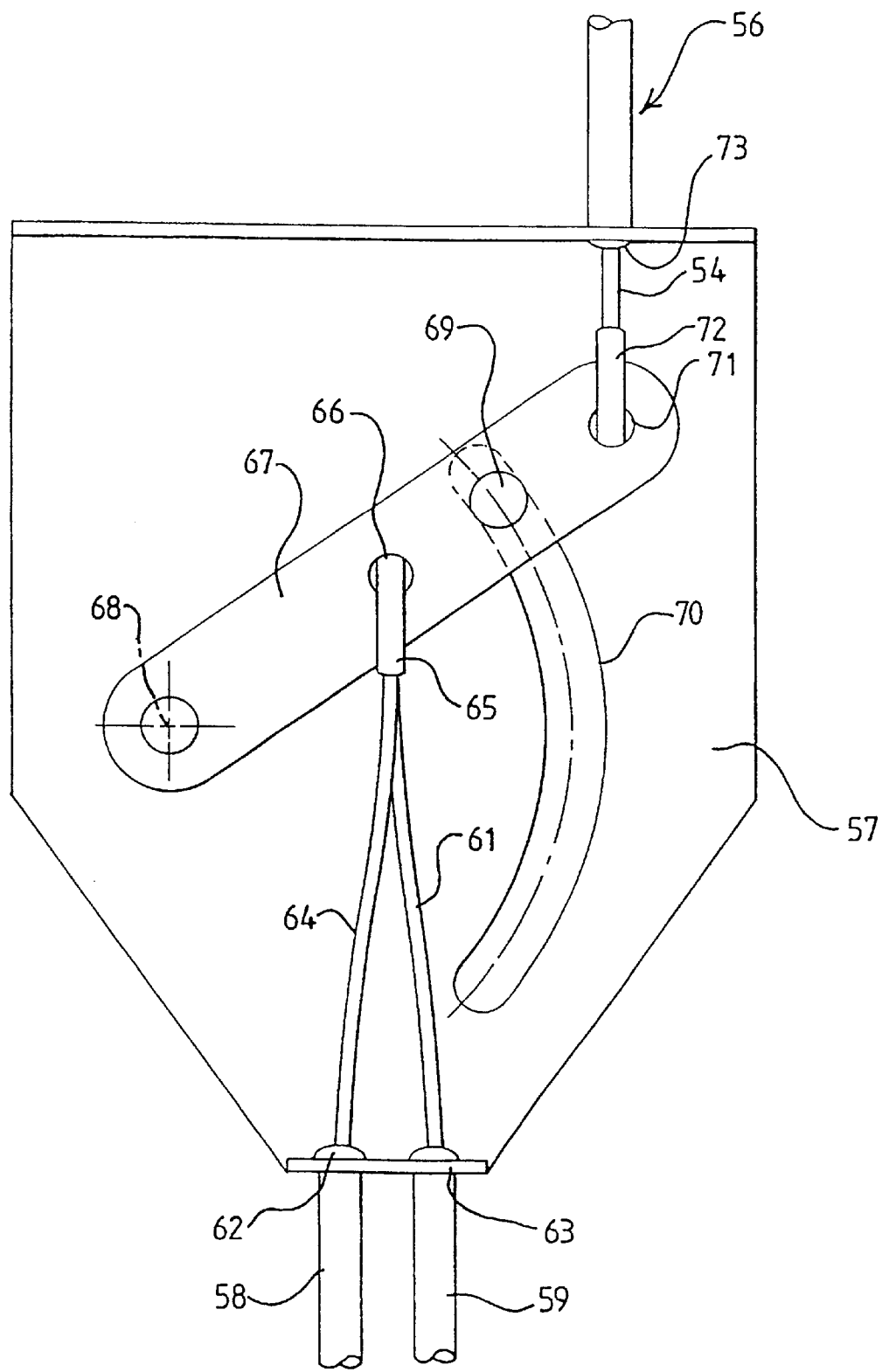
FIG. 4 is an enlarged view of die operative elements contained within a transfer box forming part of the seat illustrated in FIG. 2.

Turning now to FIG. 4 which illustrates the interior of the transfer box 57, it can be seen that the outer sleeves of the Bowden cable 58,59 terminate at nipples 62,63 respectively provided at the lower part of die transfer box 57. The cores 61,64 of the Bowden cables each pass to a hook 65. The single hook 65 engages an aperture 66 formed at the centre of a pivotally mounted lever 67. The lever 67 is pivotally mounted by a pivot pin 68 provided at one end thereof. The lever is provided with a projecting guide pin 69 which engages in an arcuate slot 70 provided in the transfer box 57. The end of the lever remote from the pivot pin 68 is provided with an aperture 71 which is engaged by a hook 72 which is connected to the core 54 of the Bowden cable 56. The outer sleeve of the Bowden cable 56 terminates at a nipple 73 provided at the upper part of the transfer box 57.

It is thus to be appreciated that when a downward force is applied to the cores 61,64 of the Bowden cables 58,59 in response to a rearward pivoting movement of the back of the seat, the lever 67 is caused to pivot downwardly about the axis defined by the pivot pin 68, applying a substantial downward force to the core 54 of the Bowden cable 56. Because tile outer sleeve of the Bowden cable 56 terminates at the nipple 55 provided on the horizontal arm 17, the core 54 extending between that nipple and the transverse element 46 is drawn upwardly into the Bowden cable, thus causing the entire head-rest support frame 42 to rise.

As illustrated most clearly in FIG. 8, the frame 42 is intended to cany a head-rest 74. Also, as is clear from FIG. 5, as the back-rest of the seat moves rearwardly with a pivoting action about the pivot axis 19, the frame 42, carrying the head-rest, rises upwardly relative to die back of the seat, thus moving the head-rest from an initial lower position in which the head-rest is close to the top of the back of the seat, to an upper position in which the head-rest is a greater distance from the top of the back of the seat. Thus, the head-rest will be moved to be in an ideal position to restrain the head of an occupant of the seat in a rear impact situation.

What is claimed is:

1. A vehicle seat, the seat comprising a squab and a back, the back being mounted for pivotal movement, relative to the squab, about a predetermined pivotal axis, the back having a head-rest and a frame supporting the head-rest, said frame being movable between a lower position and an upper position, the head-rest carried by the frame being located a greater distance from the top of the back of the seat when the frame is in the upper position, and means for moving the frame from the lower position to the upper position in response to rearward pivotal movement of the back of the seat about the predetermined pivotal axis.

2. A vehicle seat according to claim 1, wherein the means to cause the frame to move from the lower position to the upper position comprise at least one Bowden cable having a core, the core being connected to move said frame upwardly against a spring bias when the core of the cable is subjected to tension, and means to subject the core of the cable to tension in response to rearward pivotal movement of the back of the seat about the predetermined pivotal axis.

3. A vehicle seat according to claim 2, wherein the at least one Bowden cable includes a first Bowden cable and a second Bowden cable, and wherein the seat further comprises a lever connected to the core of the first Bowden cable, the lever also being connected to the second Bowden cable having a core connected to parts of a mechanism which move relative to fixed points on rearward pivotal movement of the back of the seat about the predetermined pivotal axis, the cores of the first and second Bowden cables being connected to said fixed point.

4. A vehicle seat according to claim 1, further comprising damper means connected between the squab and back of the seat to damp said rearward pivotal movement of the back of the seat.

5. A vehicle seat according to claim 4, wherein the damper means comprise a gas spring.

6. A vehicle seat according to claim 1, further comprising a recliner mechanism connected between the back and the squab of the seat.

* * * * *